United States Patent
Li et al.

(10) Patent No.: US 10,218,925 B2
(45) Date of Patent: Feb. 26, 2019

(54) METHOD AND APPARATUS FOR CORRECTING LENS DISTORTION

(71) Applicant: Huawei Technologies Co., Ltd., Shenzhen (CN)

(72) Inventors: Shuiping Li, Shenzhen (CN); Angang Deng, Shenzhen (CN); Cong Xu, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 16 days.

(21) Appl. No.: 14/719,514

(22) Filed: May 22, 2015

(65) Prior Publication Data

US 2015/0256775 A1 Sep. 10, 2015

Related U.S. Application Data

(63) Continuation of application No. PCT/CN2013/073821, filed on Apr. 7, 2013.

(30) Foreign Application Priority Data

Nov. 23, 2012 (CN) .......................... 2012 1 0482830

(51) Int. Cl.
*H04N 5/357* (2011.01)
*G06T 5/00* (2006.01)
*G06T 3/00* (2006.01)

(52) U.S. Cl.
CPC ......... *H04N 5/3572* (2013.01); *G06T 3/0018* (2013.01); *G06T 5/002* (2013.01); *G06T 5/006* (2013.01)

(58) Field of Classification Search
CPC ..... H04N 5/3572; G06T 3/0018; G06T 5/006; G06T 5/002
See application file for complete search history.

(56) References Cited

U.S. PATENT DOCUMENTS

| | | | |
|---|---|---|---|
| 7,352,913 B2* | 4/2008 | Karuta | G02B 27/0025 348/746 |
| 2004/0001152 A1 | 1/2004 | Funamoto | |
| 2008/0174822 A1 | 7/2008 | Kaimi et al. | |
| 2012/0044391 A1 | 2/2012 | Ni et al. | |

FOREIGN PATENT DOCUMENTS

| | | |
|---|---|---|
| CN | 102326380 A | 1/2012 |
| CN | 102970495 A | 3/2013 |
| JP | 20070288724 A | 11/2007 |

* cited by examiner

*Primary Examiner* — Twyler L Haskins
*Assistant Examiner* — Angel L Garces-Rivera
(74) *Attorney, Agent, or Firm* — Slater Matsil, LLP (57) ABSTRACT

The present invention discloses a method and an apparatus for correcting lens distortion. In some feasible implementation manners of the present invention, image data acquired from a lens is corrected in a horizontal direction; the image data corrected in the horizontal direction is written into a dynamic memory; image data in the dynamic memory is corrected in a vertical direction; and lens distortion correction is performed in two steps: in the horizontal direction and in the vertical direction, so that lens distortion correction is implemented at a low cost. The present invention further discloses a corresponding apparatus for correcting lens distortion.

14 Claims, 5 Drawing Sheets

S401 — A dynamic memory consecutively reads image data in a vertical direction for at least one time S402 — The dynamic memory corrects the image data consecutively read for at least one time

METHOD AND APPARATUS FOR CORRECTING LENS DISTORTION

This application is a continuation of International Application No. PCT/CN2013/073821, filed on Apr. 7, 2013, which claims priority to Chinese Patent Application No. 201210482830.3, filed on Nov. 23, 2012, both of which are hereby incorporated by reference in their entireties.

TECHNICAL FIELD

The present invention relates to a lens distortion (lens distortion) error generated when an image sensor captures an image, and more specifically, to a method and an apparatus for correcting lens distortion of a digital image.

BACKGROUND

Lens distortion is one of the most important factors that affect quality of a digital image generated by an image sensor, and a distorted image needs to be corrected.

Among existing methods for correcting lens distortion of the digital image, the following two methods are most commonly used to correct the digital image at a time.

One method is to implement one-off lens distortion correction by using an online row buffer. In this method, lens distortion correction is performed in horizontal and vertical directions at the same time when image data is acquired from a lens. The one-off correction requires a large number of row buffers to store coordinate data of distorted lines (distorted lines). This type of row buffer is a small temporary storage unit that is configured to store a row or a part of a row of the image data. Before a new coordinate of a corrected image is generated, a large number of row buffers are required to store data of adjacent rows. How many row buffers are required depends on what a maximum distortion degree is. For example, the maximum distortion degree is 20%, then for an image whose resolution is 720*1280, 20%*720/2=72 row buffers are required. The row buffer is generally a system-on-chip memory. So many row buffers may lead to a high cost, which is hard to accept in product implementation.

The other method is to implement the one-off lens distortion correction by using an offline DDR (DDR SDRAM, Double Data Rate Synchronous Dynamic Random Access Memory, hereinafter referred to as "DDR"). In this method, lens distortion correction is performed in direction and vertical directions at the same time after image data is acquired from a lens and stored in an off-chip DDR. The DDR receives a data block formed by one frame or two frames of data, and implements correction by changing a position of a pixel in an image. DDR write addresses of pixels of a corrected image are consecutive. To ensure that the DDR write addresses of the pixel of the corrected image is consecutive, a DDR read address of a pixel of an original image before correction should not satisfy consecutiveness, which causes that a DDR of a corresponding pixel cannot be consecutively read according to the read addresses, but can only be read in a skipping manner according to nonconsecutive addresses. However, a refresh cycle is required during a DDR read operation. That the DDR cannot be consecutively read leads to a low DDR read efficiency, which is hard to accept in product implementation.

Although the DDR read addresses of the corresponding pixel are inconsecutive, other useless pixel data that includes the corresponding pixel may be consecutively read to ensure that the read addresses are consecutive. A size of a block that is read at a time is equal to "consecutive length*consecutive number". The consecutive length refers to the sum of pixels that can be read consecutively in a refresh cycle; and if a distortion occurs, the consecutive reading stops. The consecutive length may be a transverse length in a horizontal direction. The consecutive number refers to the number of times, allowed by a system, of restarting the consecutive reading in a block read by the DDR at a time. The consecutive length may be a column length in a vertical direction. The consecutive length and the consecutive number herein are both determined by a radial distortion degree, but the "consecutive length*consecutive number" is limited by product implementation performance. When the radial distortion degree is relatively high, "consecutive length*consecutive number" determined by the radial distortion degree may exceed a product implementation performance limit, and therefore it cannot be ensured that the read addresses are consecutive.

The foregoing correction methods have a high cost and a low efficiency. Therefore, a method and an apparatus for correcting lens distortion that have a low cost and a high correction efficiency are required.

SUMMARY

The present invention provides a method and an apparatus for correcting lens distortion, which can implement lens distortion correction at a low cost.

A first aspect of the present invention provides a method for correcting lens distortion, which may include the following steps:

correcting image data acquired from a lens in a horizontal direction;

writing the image data corrected in the horizontal direction into a dynamic memory; and correcting image data in the dynamic memory in a vertical direction.

In a first possible implementation manner, the correcting image data acquired from a lens in a horizontal direction includes:

scanning images on the lens row by row to obtain the image data; and correcting the image data row by row in the horizontal direction.

In a second possible implementation manner, the correcting image data acquired from a lens in a horizontal direction includes:

scanning images on the lens row by row to obtain the image data;

writing at least one row of the image data into a row buffer; and correcting the at least one row of the image data in the row buffer in the horizontal direction.

With reference to the first aspect, the first possible implementation manner of the first aspect, or the second possible implementation manner of the first aspect, in a third possible implementation manner, the correcting image data in the dynamic memory in a vertical direction includes:

consecutively reading, by the dynamic memory, the image data in the vertical direction for at least one time; and correcting, by the dynamic memory, the image data read consecutively for at least one time.

With reference to the first aspect, the first possible implementation manner of the first aspect, or the second possible implementation manner of the first aspect, in a fourth possible implementation manner, the correcting image data in the dynamic memory in a vertical direction includes:

rotating the image data in the dynamic memory by 90 degrees; and correcting the rotated image data in the vertical direction.

With reference to the fourth possible implementation manner of the first aspect, in a fifth possible implementation manner, the correcting the rotated image data in the vertical direction includes:

consecutively reading, by the dynamic memory for at least one time, the image data corrected in the horizontal direction; and correcting, by the dynamic memory, the image data read consecutively for at least one time.

With reference to the fifth possible implementation manner of the first aspect, in a sixth possible implementation manner, a maximum length of the image data consecutively read by the dynamic memory at a time is a length of a row of image data corrected in the horizontal direction in a read DDR data block.

A second aspect of the present invention provides an apparatus for correcting lens distortion, which may include:

a first correcting unit, configured to correct image data acquired from a lens in a horizontal direction;

a first writing unit, configured to write the image data corrected in the horizontal direction into a dynamic memory; and a second correcting unit, configured to correct image data in the dynamic memory in a vertical direction.

In a first possible implementation manner, the first correcting unit includes:

a first acquiring unit, configured to scan images on the lens row by row to obtain the image data; and a third correcting unit, configured to correct the image data row by row in the horizontal direction.

In a second possible implementation manner, the first correcting unit includes:

a second acquiring unit, configured to scan the images on the lens row by row to obtain the image data;

a second writing unit, configured to write at least one row of the image data into a row buffer; and a fourth correcting unit, configured to correct the at least one row of the image data in the row buffer in the horizontal direction.

With reference to the second aspect, the first possible implementation manner of the second aspect, or the second possible implementation manner of the second aspect, in a third possible implementation manner, the second correcting unit includes:

a first reading unit, configured for the dynamic memory to consecutively read the image data in the vertical direction for at least one time; and a fifth correcting unit, configured for the dynamic memory to correct the image data read consecutively for at least one time.

With reference to the second aspect, the first possible implementation manner of the second aspect, or the second possible implementation manner of the second aspect, in a fourth possible implementation manner, the second correcting unit includes:

a rotating unit, configured to rotate the image data in the dynamic memory by 90 degrees; and a sixth correcting unit, configured to correct the rotated image data in the vertical direction.

With reference to the fourth possible implementation manner of the second aspect, in a fifth possible implementation manner, the sixth correcting unit includes:

a second reading unit, configured for the dynamic memory to consecutively read, for at least one time, the image data corrected in the horizontal direction; and a seventh correcting unit, configured for the dynamic memory to correct the image data read consecutively for at least one time.

With reference to the fifth possible implementation manner of the second aspect, in a sixth possible implementation manner, a maximum length of image data consecutively read by the dynamic memory at a time is a length of a row of image data corrected in the horizontal direction in a read DDR data block.

It can be learned from the above that, in some feasible implementation manners of the present invention, lens distortion correction is performed in two steps: correction in a horizontal direction and correction in a vertical direction, so that lens distortion correction is implemented at a low cost.

BRIEF DESCRIPTION OF THE DRAWINGS

To describe the technical solutions in the embodiments of the present invention more clearly, the following briefly introduces the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

Lens distortion is optical aberration generated when an imaging object does not locate at an optical axis position of a lens. A result is that a deviation is generated between a coordinate of a digital image and a coordinate of the image object. Among various types of lens distortion, one of the most common and the most serious types is radial distortion that deviates from an optical center of the digital image along a radial line.

Figure 1A:
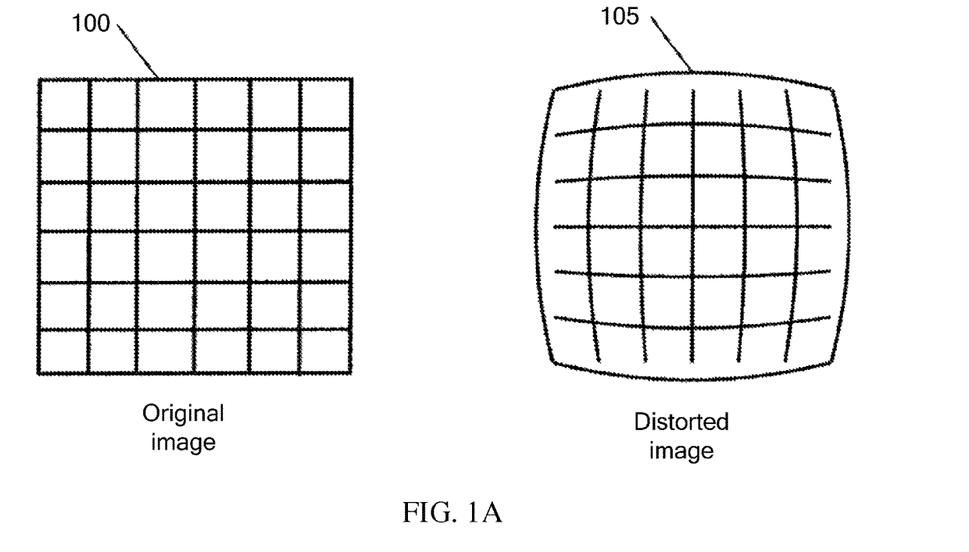
FIG. 1A and FIG. 1B are schematic diagrams of an original image and a distorted image.
Figure 1B:
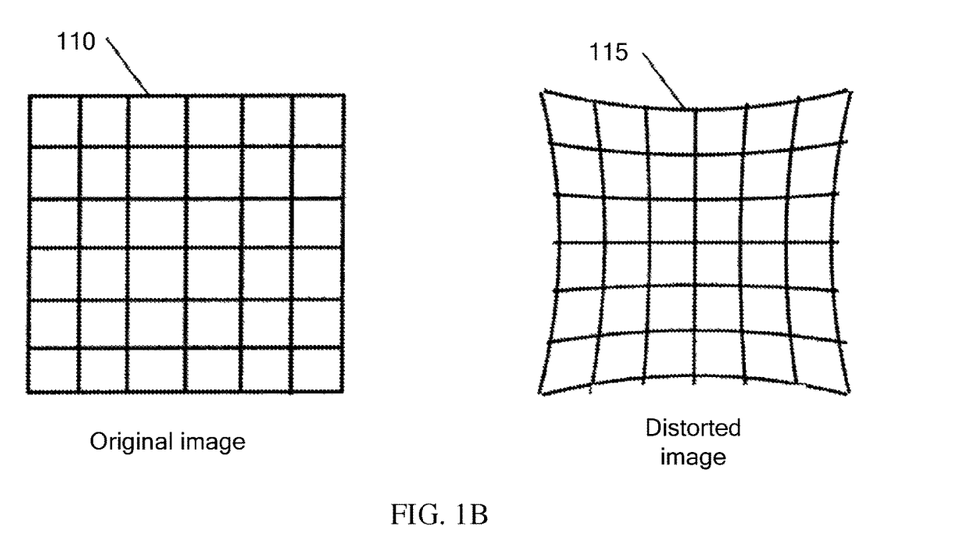

A radially distorted digital image bends towards an image center or bends outwards, as shown in FIG. 1A and FIG. 1B. In FIG. 1A, a distorted image 105 looks like a sphere or a barrel, and the image bends towards an off-center direction, because image magnification decreases with an increase of a distance from the optical center. This type of radial distortion is commonly referred to as "barrel" distortion. A distorted image 115 shown in FIG. 1B has an opposite effect. The image bends towards the off-center direction, because the image magnification increases with the increase of the distance from the optical center. This type of radial distortion is commonly referred to as "pincushion" distortion, a shape of which is like that the center is squeezed. Another type of radial distortion is moustache distortion (moustache distortion). This is a mixture of barrel distortion (at the image center) and pincushion distortion (on an image edge).

The foregoing three types of radial distortion may cause a gross error of the digital image, which must be corrected.

Figure 2:
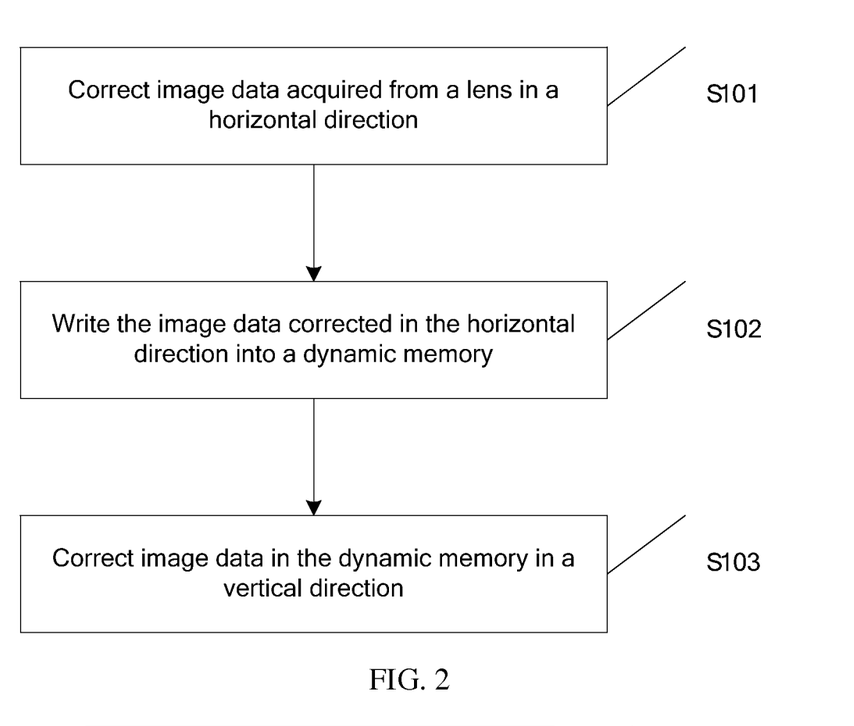
FIG. 2 is a method flowchart of a first embodiment of a method for correcting lens distortion according to the present invention.

FIG. 2 is a method flowchart of a first embodiment of a method for correcting lens distortion according to the present invention. As shown in FIG. 2, the method for correcting lens distortion includes the following steps:

Step S101: Correct image data acquired from a lens in a horizontal direction.

Figure 3:
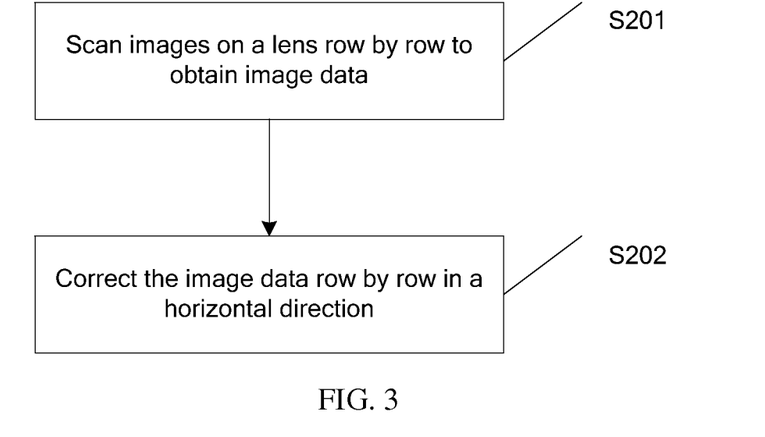
FIG. 3 is a method flowchart of an implementation manner of correction in a horizontal direction in a first embodiment of a method for correcting lens distortion according to the present invention.

In this embodiment, acquiring the image data from an optical lens, and correcting the acquired image data in the horizontal direction is an implementation manner. As shown in FIG. 3, step S101 may include the following steps:

Step S201: Scan images on the lens row by row to obtain the image data.

Step S202: Correct the image data row by row in the horizontal direction.

Because a row is corrected after being scanned, no row buffer is required.

Figure 4:
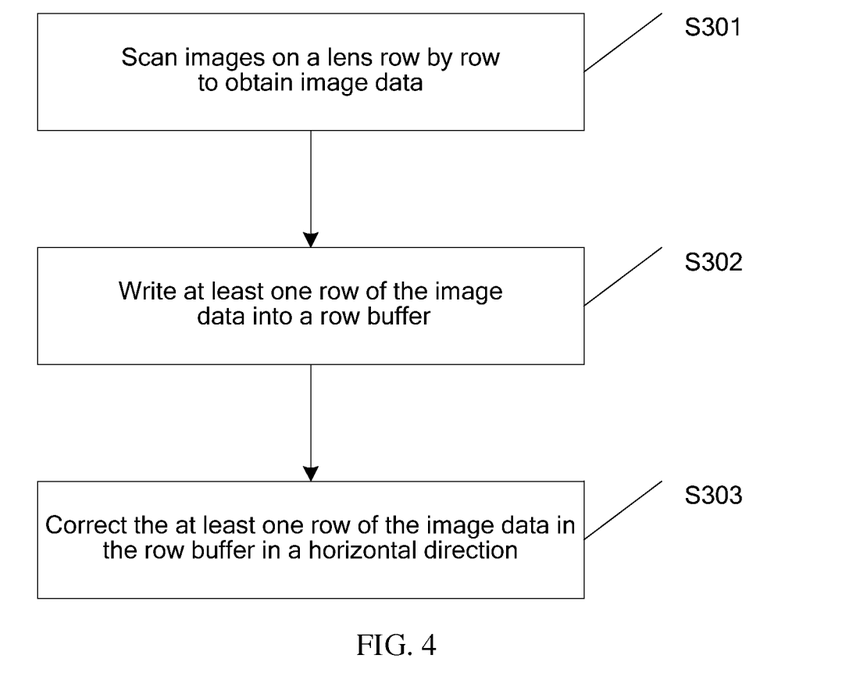
FIG. 4 is a method flowchart of another implementation manner of correction in a horizontal direction in a first embodiment of a method for correcting lens distortion according to the present invention.

As another implementation manner, as shown in FIG. 4, step S101 may also include the following steps:

Step S301: Scan the images on the lens row by row to obtain the image data.

Step S302: Write at least one row of the image data into a row buffer.

Step S303: Correct the at least one row of the image data in the row buffer in the horizontal direction.

Because correction is performed only in the horizontal direction, few row buffers are required. The number of the required row buffers equals only the sum of distortion data of every row in a few multiple rows in the horizontal direction.

The method in step S101 is used to correct the image data in the horizontal direction, and no row buffer is required or only a few row buffers are required. In this way, a correction cost is greatly reduced.

Step S102: Write the image data corrected in the horizontal direction into a dynamic memory.

In this embodiment, step S102 may be implemented independently, and may also be implemented at the same time when step S101 is complete. The dynamic memory may be a DDR, and step S102 is: write the image data corrected in the horizontal direction into the DDR to turn the image data into DDR block data.

Step S103: Correct image data in the dynamic memory in a vertical direction.

Figure 5:
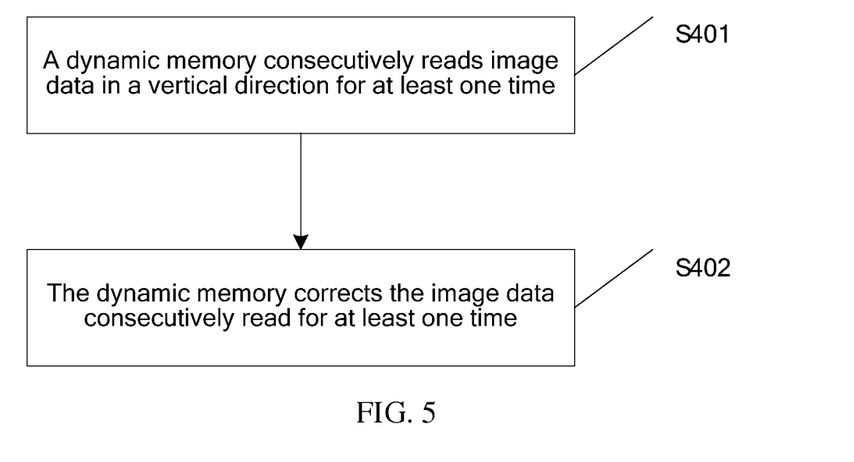
FIG. 5 is a method flowchart of an implementation manner of correction in a vertical direction in a first embodiment of a method for correcting lens distortion according to the present invention.

In this embodiment, correcting the image data in the dynamic memory in the vertical direction is an implementation manner. As shown in FIG. 5, step S103 includes the following steps:

Step S401: The dynamic memory consecutively reads the image data in the vertical direction for at least one time.

Step S402: The dynamic memory corrects the image data read consecutively for at least one time.

In this implementation manner, the dynamic memory, such as the DDR, is required to correct the image data stored in the dynamic memory only in the vertical direction. The DDR consecutively reads image data of a DDR block in a vertical direction for at least one time, and then corrects the image data read consecutively for at least one time. Because the image data has been corrected in the horizontal direction, pixels in the DDR block data are consecutive in the horizontal direction. A consecutive length may be chosen according to maximum performance achieved by a product. However, a vertical column length that is corrected in the vertical direction is determined by a distortion degree, that is, the distortion degree determines a consecutive number. In addition, a current image sensor generally runs a rotation algorithm when forming image data, and running the rotation algorithm needs to occupy DDR bandwidth. In this case, disabling the rotation algorithm can release some DDR bandwidth, and eventually reduces a product implementation cost.

According to a first embodiment of a method for correcting lens distortion provided in the present invention, lens distortion correction is performed in two steps: correction in a horizontal direction and correction in a vertical direction, so that the lens distortion correction is implemented at a low cost.

Figure 6:
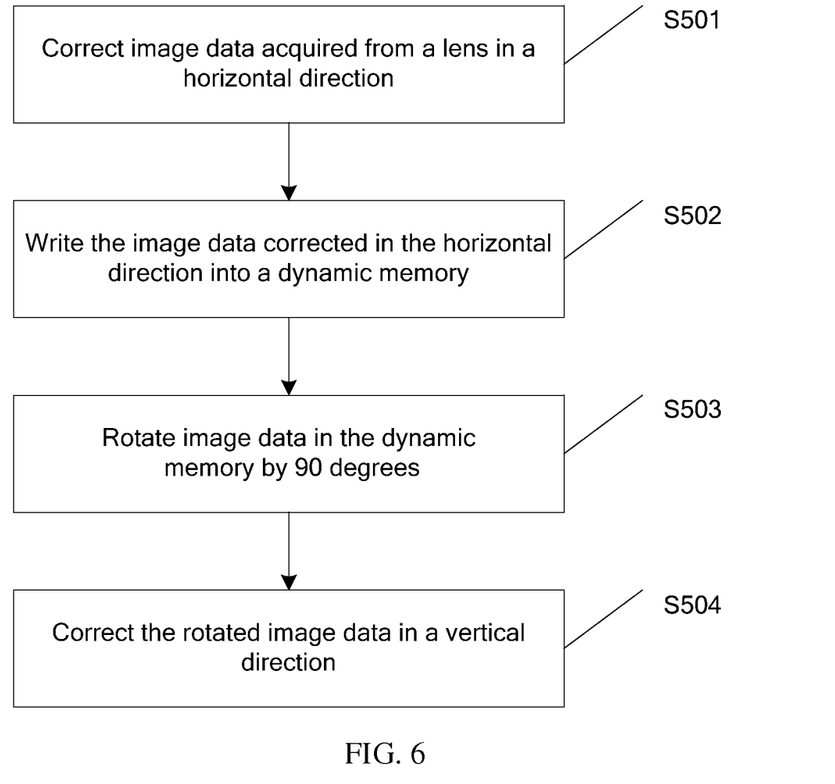
FIG. 6 is a method flowchart of a second embodiment of a method for correcting lens distortion according to the present invention.

FIG. 6 is a method flowchart of a second embodiment of a method for correcting lens distortion according to the present invention. As shown in FIG. 6, the method for correcting lens distortion includes the following steps:

Step S501: Correct image data acquired from a lens in a horizontal direction.

Step S502: Write the image data corrected in the horizontal direction into a dynamic memory.

Step S501 and step S502 are the same as step S101 and step S102 in the foregoing first embodiment, respectively. Details are not described herein again. In this embodiment, the dynamic memory is a DDR.

Step S503: Rotate image data in the dynamic memory by 90 degrees.

In this embodiment, a rotation algorithm in a system is enabled, and the image data in the dynamic memory is read, rotated by 90 degrees, and written into the dynamic memory again.

Step S504: Correct the rotated image data in a vertical direction.

Figure 7:
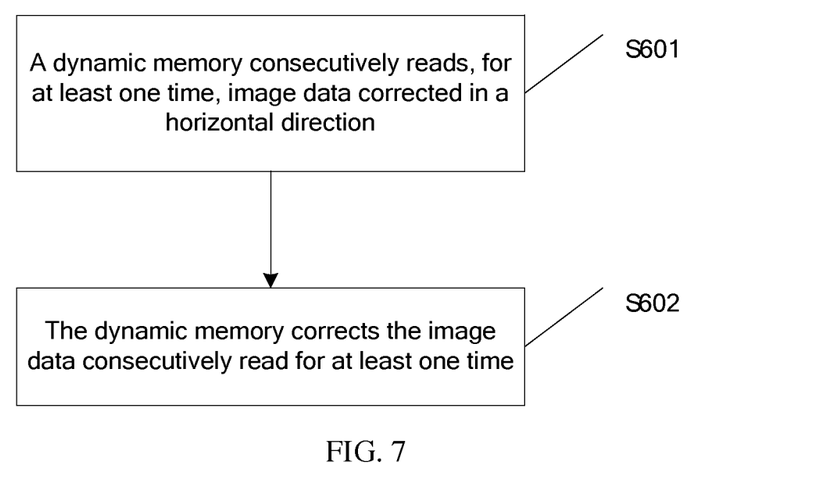
FIG. 7 is a method flowchart of an implementation manner of correcting rotated image data in a vertical direction in a second embodiment of a method for correcting lens distortion according to the present invention.

As an implementation manner, as shown in FIG. 7, step S504 may include the following steps:

Step S601: The dynamic memory consecutively reads, for at least one time, the image data corrected in the horizontal direction.

Step S602: The dynamic memory corrects the image data read consecutively for at least one time.

In this implementation manner, after a 90-degree rotation is complete, rotated image data is corrected in the vertical direction. In this case, original vertical column data becomes horizontal row data, and original horizontal row data becomes vertical column data. When DDR correction is performed on the image data in the vertical direction (the vertical direction herein refers to a vertical direction of a topmost original image) after a rotation algorithm, which is equivalent to that consecutive reading and writing operations are performed on DDR block data, after the rotation algorithm, according to a consecutive address in a horizontal direction, a maximum length of image data consecutively read by the dynamic memory is a length of a row of image data corrected in the horizontal direction in read DDR block data, and the consecutive number may be chosen in a relatively free manner according to a need.

According to a second embodiment of a method for correcting lens distortion provided in the present invention, lens distortion correction is performed in two steps: correction in a horizontal direction and correction in a vertical direction, in combination with a rotation algorithm. Correction in the horizontal direction mitigates a need for row buffers, and correction in the vertical direction improves read and write efficiency of a dynamic memory in an overall manner. Eventually, lens distortion correction is implemented at a low cost. In addition, a horizontal correction function and a vertical correction function regarding lens distortion can be implemented independently, and a point of experience is added for a user.

Figure 8:
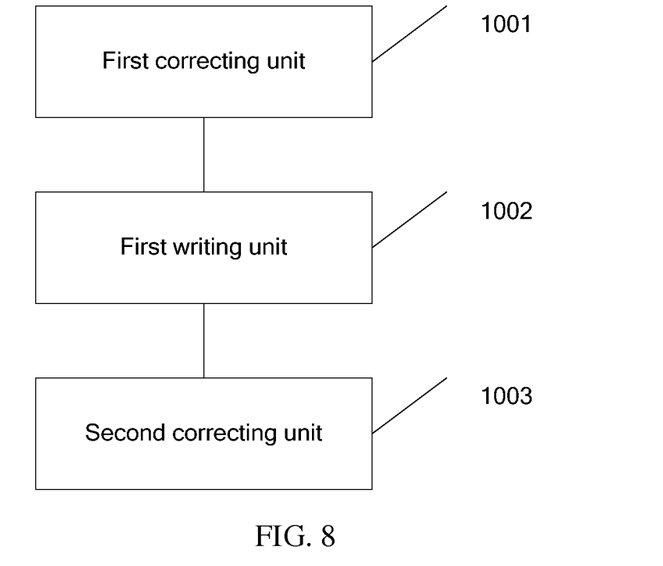
FIG. 8 is a schematic structural diagram of a first embodiment of an apparatus for correcting lens distortion according to the present invention.

FIG. 8 is a schematic structural diagram of a first embodiment of an apparatus for correcting lens distortion according to the present invention. As shown in FIG. 8, the apparatus for correcting lens distortion includes a first correcting unit 1001, a first writing unit 1002, and a second correcting unit 1003.

The first correcting unit 1001 is configured to correct image data acquired from a lens in a horizontal direction.

In this embodiment, as an implementation manner, the first correcting unit 1001 may include:

a first acquiring unit, configured to scan images on the lens row by row to obtain the image data; and a third correcting unit, configured to correct the image data row by row in the horizontal direction.

Because a row is corrected after being scanned, no row buffer is required.

As another implementation manner, the first correcting unit 1001 may include:

a second acquiring unit, configured to scan the images on the lens row by row to obtain the image data;

a second writing unit, configured to write at least one row of the image data into a row buffer; and a fourth correcting unit, configured to correct the at least one row of the image data in the row buffer in the horizontal direction.

Because correction is performed only in the horizontal direction, few row buffers are required. The number of the required row buffers equals only the sum of distortion data of every row in a few multiple rows in the horizontal direction.

The first correcting unit 1001 is used to correct the image data in the horizontal direction, and no row buffer is required or only a few row buffers are required. In this way, a correction cost is greatly reduced.

The first writing unit 1002 is configured to write the image data corrected in the horizontal direction into a dynamic memory.

In this embodiment, the writing unit 1002 may independently write the image data corrected in the horizontal direction into the dynamic memory, and may also implement the writing while captured image data is being corrected in the horizontal direction, and the dynamic memory may be a DDR.

The second correcting unit 1003 is configured to correct image data in the dynamic memory in a vertical direction.

In this embodiment, as an implementation manner, the second correcting unit 1003 may include:

a first reading unit, configured for the dynamic memory to consecutively read the image data in the vertical direction for at least one time; and a fifth correcting unit, configured for the dynamic memory to correct the image data read consecutively for at least one time.

In this implementation manner, the dynamic memory, such as the DDR, is required to correct the image data stored in the dynamic memory only in the vertical direction. The DDR consecutively reads image data of a DDR block in a vertical direction for at least one time, and then corrects the image data read consecutively for at least one time. Because the image data has been corrected in the horizontal direction, pixels in the DDR block data are consecutive in the horizontal direction. A consecutive length may be chosen according to maximum performance achieved by a product. However, a vertical column length that is corrected in the vertical direction is determined by a distortion degree, that is, the distortion degree determines a consecutive number. In addition, a current image sensor generally runs a rotation algorithm when forming image data, and running the rotation algorithm needs to occupy DDR bandwidth. In this case, disabling the rotation algorithm can release some DDR bandwidth, and eventually reduces a product implementation cost.

According to a first embodiment of an apparatus for correcting lens distortion provided in the present invention, lens distortion correction is performed in two steps: correction in a horizontal direction and correction in a vertical direction, so that the lens distortion correction is implemented at a low cost.

Figure 9:
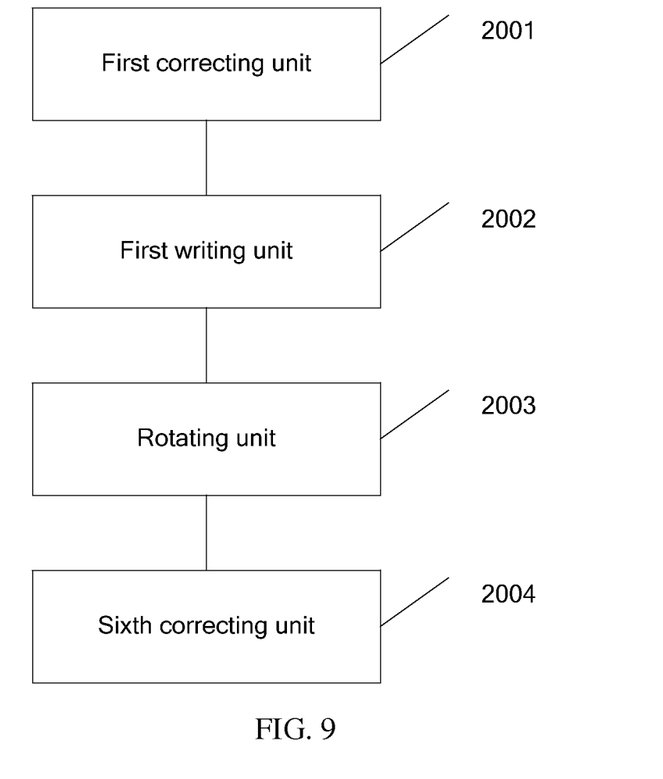
FIG. 9 is a schematic structural diagram of a second embodiment of an apparatus for correcting lens distortion according to the present invention.

FIG. 9 is a schematic structural diagram of a second embodiment of an apparatus for correcting lens distortion according to the present invention. As shown in FIG. 9, the apparatus for correcting lens distortion includes a first correcting unit 2001, a first writing unit 2002, a rotating unit 2003, and a sixth correcting unit 2004.

The first correcting unit 2001 is configured to correct image data acquired from a lens in a horizontal direction.

The first writing unit 2002 is configured to write the image data corrected in the horizontal direction into a dynamic memory.

In this embodiment, the first correcting unit 2001 and the writing unit 2002 are the same as the first correcting unit 1001 and the writing unit 1002 in the foregoing first embodiment, respectively. Details are not described herein again.

The rotating unit 2003 is configured to rotate the image data in the dynamic memory by 90 degrees.

In this embodiment, a rotation algorithm in a system is enabled, and the image data in the dynamic memory is read, rotated by 90 degrees, and written into the dynamic memory again.

The sixth correcting unit 2004 is configured to correct the rotated image data in the vertical direction.

As an implementation manner, the sixth correcting unit 2004 may include:

a second reading unit, configured for the dynamic memory to consecutively read, for at least one time, the image data corrected in the horizontal direction; and a seventh correcting unit, configured for the dynamic memory to correct the image data read consecutively for at least one time.

In this implementation manner, after a 90-degree rotation is complete, rotated image data is corrected in the vertical direction. In this case, original vertical column data becomes horizontal row data, and original horizontal row data becomes vertical column data. When DDR correction is performed on the image data in the vertical direction (the vertical direction herein refers to a vertical direction of a topmost original image) after a rotation algorithm, which is equivalent to that consecutive reading and writing operations are performed on DDR block data, after the rotation algorithm, according to a consecutive address in a horizontal direction, a maximum length of image data consecutively read by the dynamic memory is a length of a row of image data corrected in the horizontal direction in read DDR block data, and the consecutive number may be chosen in a relatively free manner according to a need.

According to a second embodiment of an apparatus for correcting lens distortion provided in the present invention, lens distortion correction is performed in two steps: correction in a horizontal direction and correction in a vertical direction, in combination with a rotation algorithm. Correction in the horizontal direction mitigates a need for row buffers, and correction in the vertical direction improves read and write efficiency of a dynamic memory in an overall manner. Eventually, lens distortion correction is implemented at a low cost. In addition, a horizontal correction function and a vertical correction function regarding lens distortion can be implemented independently, and a point of experience is added for a user.

It may be clearly understood by a person skilled in the art that, for the purpose of convenient and brief description, for a detailed working process of the foregoing device and module, reference may be made to a corresponding process in the foregoing method embodiments, and details are not described herein again.

In the several embodiments provided in the present application, it should be understood that the disclosed device and method may be implemented in other manners. For example, the described apparatus embodiment is merely exemplary. For example, the module division is merely logical function division and may be other division in actual implementation. For example, a plurality of modules or components may be combined or integrated into another device, or some features may be ignored or not performed. In addition, the displayed or discussed mutual couplings or direct couplings or communication connections may be implemented through some communication interfaces. The indirect couplings or communication connections between the apparatuses or modules may be implemented in electronic, mechanical, or other forms.

The modules described as stand-alone components above may be separated physically or not; and the components illustrated as modules may be physical modules or not. A part or all of the modules may be selected according to actual needs to achieve the objectives of the solutions of the embodiments.

In addition, functional modules in the embodiments of the present invention may be integrated into one processing module, or each of the modules may exist alone physically, or two or more modules are integrated into one module.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A method, comprising:
performing a first correction of radial lens distortion in image data acquired from a lens in a horizontal direction, before the image data is written into a dynamic memory;
writing the image data into the dynamic memory after performing the first correction; and
performing a second correction in the dynamic memory of the radial lens distortion in the image data written into the dynamic memory in the vertical direction using a column length selected according to a degree of radial distortion of the image data, wherein the column length is a sum of pixels that can be read consecutively in a refresh cycle of the dynamic memory.

2. The method according to claim 1, further comprising:
scanning images on the lens, row by row, to acquire the image data from the lens;
wherein performing the first correction comprises performing the first correction of the radial lens distortion in the image data, row by row, in the horizontal direction, before the image data is written into the dynamic memory.

3. The method according to claim 1, wherein performing the first correction comprises:
scanning images on the lens, row by row, to acquire the image data from the lens;
writing at least one row of the image data into a row buffer; and
correcting the radial lens distortion in the at least one row of the image data in the row buffer in the horizontal direction, before writing the row into the dynamic memory.

4. The method according to claim 1, wherein performing the second correction comprises:
consecutively reading, by the dynamic memory, for at least one time and in the vertical direction, the image data written into the dynamic memory; and
performing, by the dynamic memory, the second correction of the radial lens distortion in the image data read consecutively at least one time in the vertical direction.

5. The method according to claim 4, wherein:
the dynamic memory is a double data rate synchronous dynamic random access memory (DDR SDRAM);
performing the first correction comprises performing the first correction of the radial lens distortion of the image data acquired from the lens in the horizontal direction in a first row of the image data, wherein the first row has a first length;
writing the image data comprises writing the first row of the image data into the dynamic memory in a DDR SDRAM data block, after performing the first correction in the first row of the image data; and
consecutively reading the image data written into the dynamic memory comprises consecutively reading, at a time, a maximum length of the image data written into the dynamic memory by the dynamic memory equal to the first length of the first row of the image data written into the dynamic memory in the DDR SDRAM data block.

6. An apparatus, comprising:
a processor; and
a non-transitory computer-readable storage medium storing a program to be executed by the processor, the program including instructions to:
  perform a first correction of radial lens distortion in image data acquired from a lens in a horizontal direction, before the image data is written into a dynamic memory;
  write the image data into the dynamic memory after performing the first correction; and
  perform a second correction in the dynamic memory of the radial lens distortion in the image data in the vertical direction using a column length selected according to a degree of radial distortion of the image data, wherein the column length is a sum of pixels that can be read consecutively in a refresh cycle of the dynamic memory.

7. The apparatus according to claim 6, wherein the program further comprises instructions to:
  scan images on the lens, row by row, to acquire the image data from the lens;
  wherein the instructions to perform the first correction comprise instructions to perform the first correction of the radial lens distortion in the image data, row by row, in the horizontal direction, before writing the image data is written into the dynamic memory.

8. The apparatus according to claim 6, wherein instructions to perform the first correction comprise instructions to:
  a second acquiring unit, configured to scan images on the lens, row by row, to acquire the image data from the lens;
  a second writing unit, configured to write at least one row of the image data into a row buffer; and
  a fourth correcting unit, configured to correct the radial lens distortion in at least one row of the image data in the row buffer in the horizontal direction, before the row is written into the dynamic memory.

9. The apparatus according to claim 6, wherein instructions to perform the second correction comprise instructions to:
  cause the dynamic memory to consecutively read, for at least one time and in the vertical direction, the image data written into the dynamic memory; and
  cause the dynamic memory to perform the second correction of the radial lens distortion in the image data read consecutively for at least one time in the vertical direction.

10. The apparatus according to claim 9, wherein:
  the dynamic memory is a double data rate synchronous dynamic random access memory (DDR SDRAM);
  the instructions to perform the first correction comprise instructions to perform the first correction of the radial lens distortion of the image data acquired from the lens in the horizontal direction in a first row of the image data, wherein the first row has a first length;
  the instructions to write the image data comprises writing the first row of the image data into the dynamic memory as a DDR SDRAM data block, after the first correction is performed in the first row of the image data; and
  the instructions to cause the dynamic memory to consecutively read the image data written into the dynamic memory comprise instructions to cause the dynamic memory to consecutively read, at a time, a maximum length of the image data written into the dynamic memory equal to the first length of the first row of the image data written into the dynamic memory as the DDR SDRAM data block.

11. An apparatus, comprising:
a first correcting circuit having circuitry to perform a first correction, in a horizontal direction, of radial lens distortion of image data acquired from an image sensor, before the image data is written into a dynamic memory;
a first writing circuit having circuitry to write the image data into the dynamic memory after performing the first correction; and
a sixth correcting circuit having circuitry to perform a second correction in the dynamic memory of the radial lens distortion in the image data written into the dynamic memory in the vertical direction using a column length selected according to a degree of radial distortion of the image data, wherein the column length is a sum of pixels that can be read consecutively in a refresh cycle of the dynamic memory.

12. The apparatus according to claim 11, further comprising:
a first acquiring circuit having circuitry to scan images on the image sensor, row by row, to acquire the image data from the image sensor; and
wherein the first correcting circuit comprises a third correcting circuit having circuitry to correct the radial lens distortion in the image data row by row in the horizontal direction, before the image data is written into the dynamic memory.

13. The apparatus according to claim 11, wherein the first correcting circuit comprises:
a second acquiring circuit having circuitry to scan images from the image sensor, row by row, to acquire the image data from the image sensor;
a second writing circuit having circuitry to write at least one row of the image data into a row buffer; and
a fourth correcting circuit having circuitry to configured to correct the radial lens distortion, in the horizontal direction, in the at least one row of the image data in the row buffer, before the row is written into the dynamic memory.

14. The apparatus according to claim 11, wherein:
the dynamic memory is a double data rate synchronous dynamic random access memory (DDR SDRAM);
the first correcting circuit has circuitry to perform the first correction, in a horizontal direction, of radial lens distortion of a first row of the image data acquired from the image sensor, wherein the first row has a first length;
the first writing circuit has circuitry to write the first row of the image data into the dynamic memory as a DDR SDRAM data block, after the first correction is performed by the first correcting circuit; and
the second reading circuit has circuitry to permit the dynamic memory to consecutively read, at a time, a maximum length of the image data written into the dynamic memory equal to the first length of the first row of the image data written into the dynamic memory in the DDR SDRAM data block.

* * * * *